I. RASKIN & J. DERETCHIN.
DOUGH BRAKE.
APPLICATION FILED APR. 23, 1910.
1,007,732.
Patented Nov. 7, 1911.
3 SHEETS—SHEET 1.
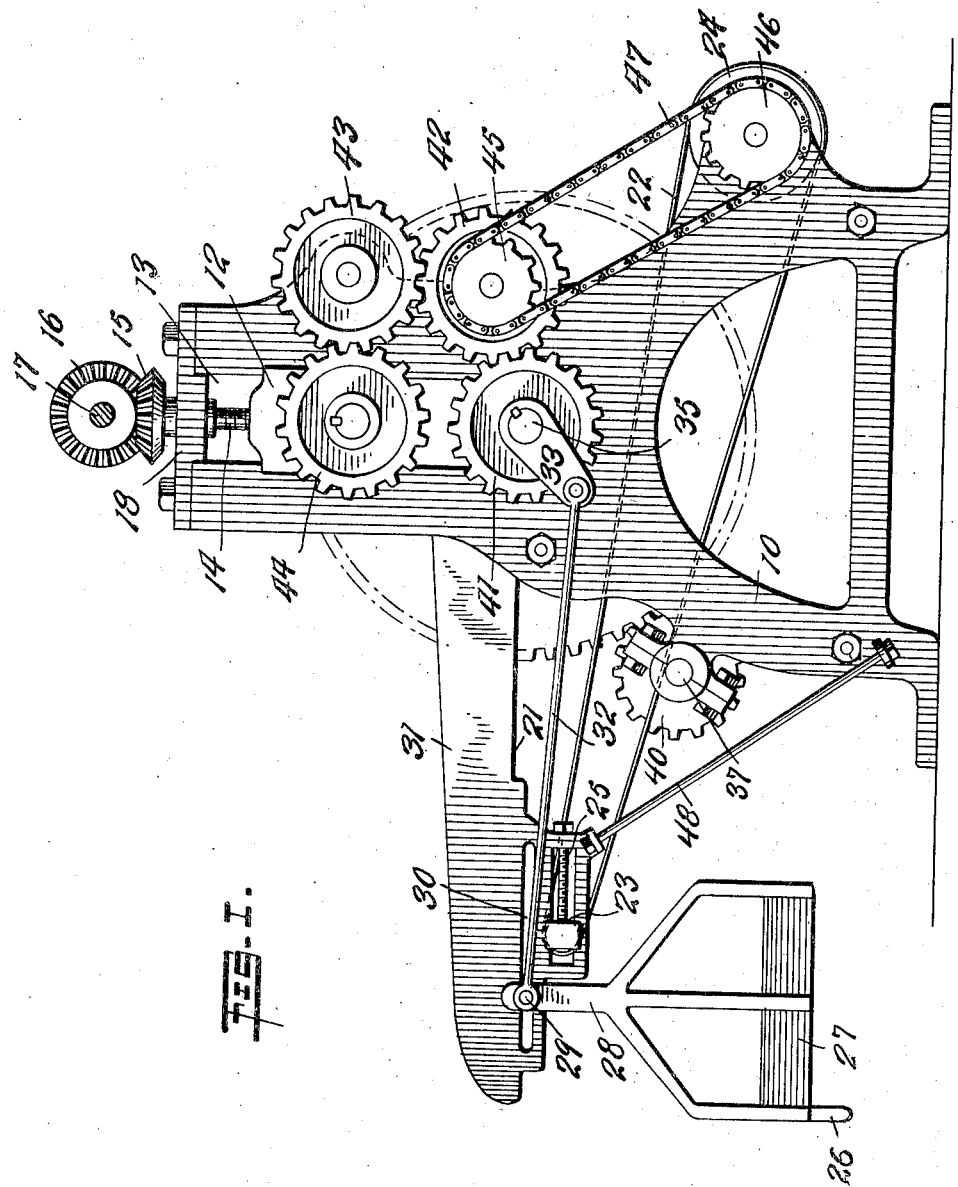
WITNESSES
G. Robert Thomas
E. H. Stock
INVENTORS
Isaac Raskin and
James Deretchin
BY
E. T. & J. F. Brandenburg
ATTORNEYS

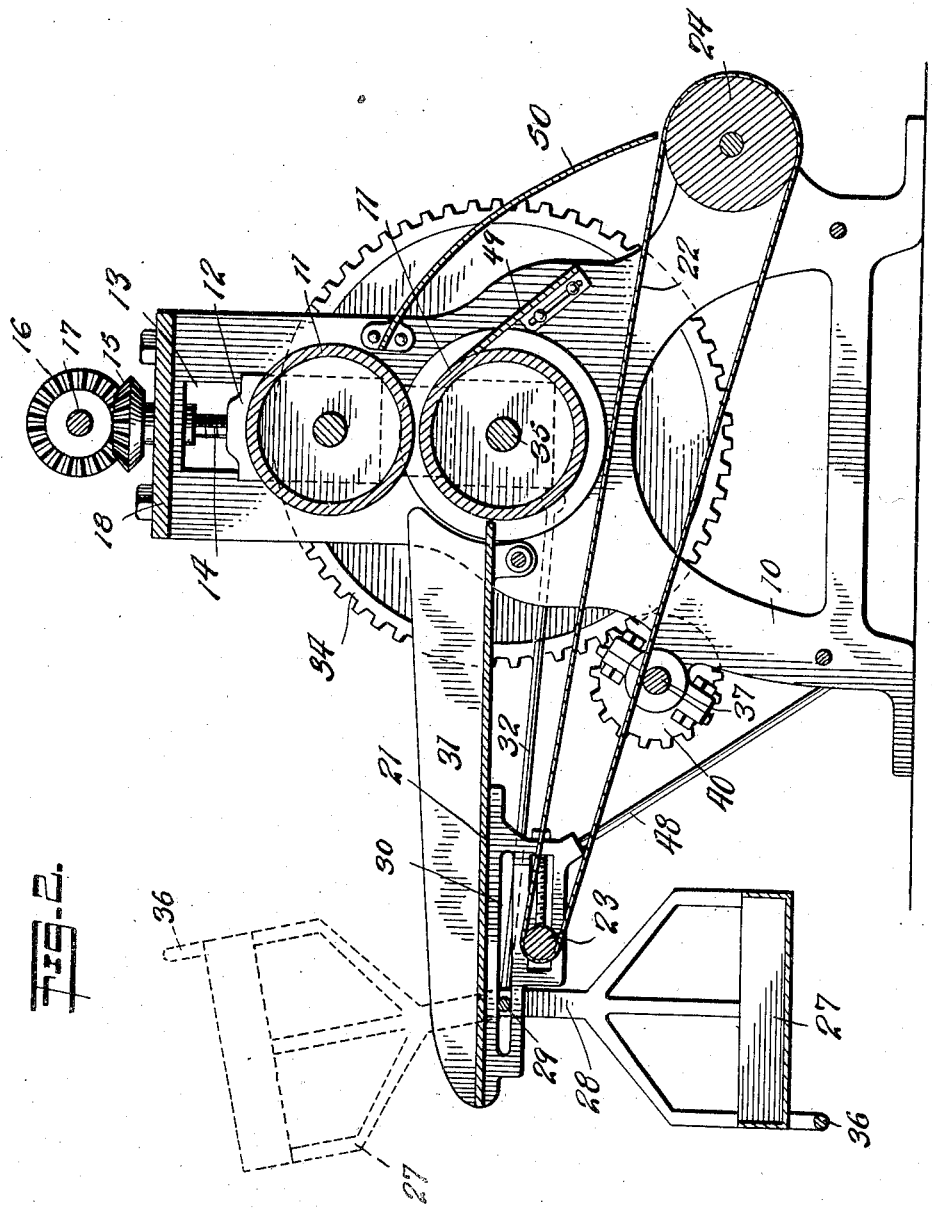

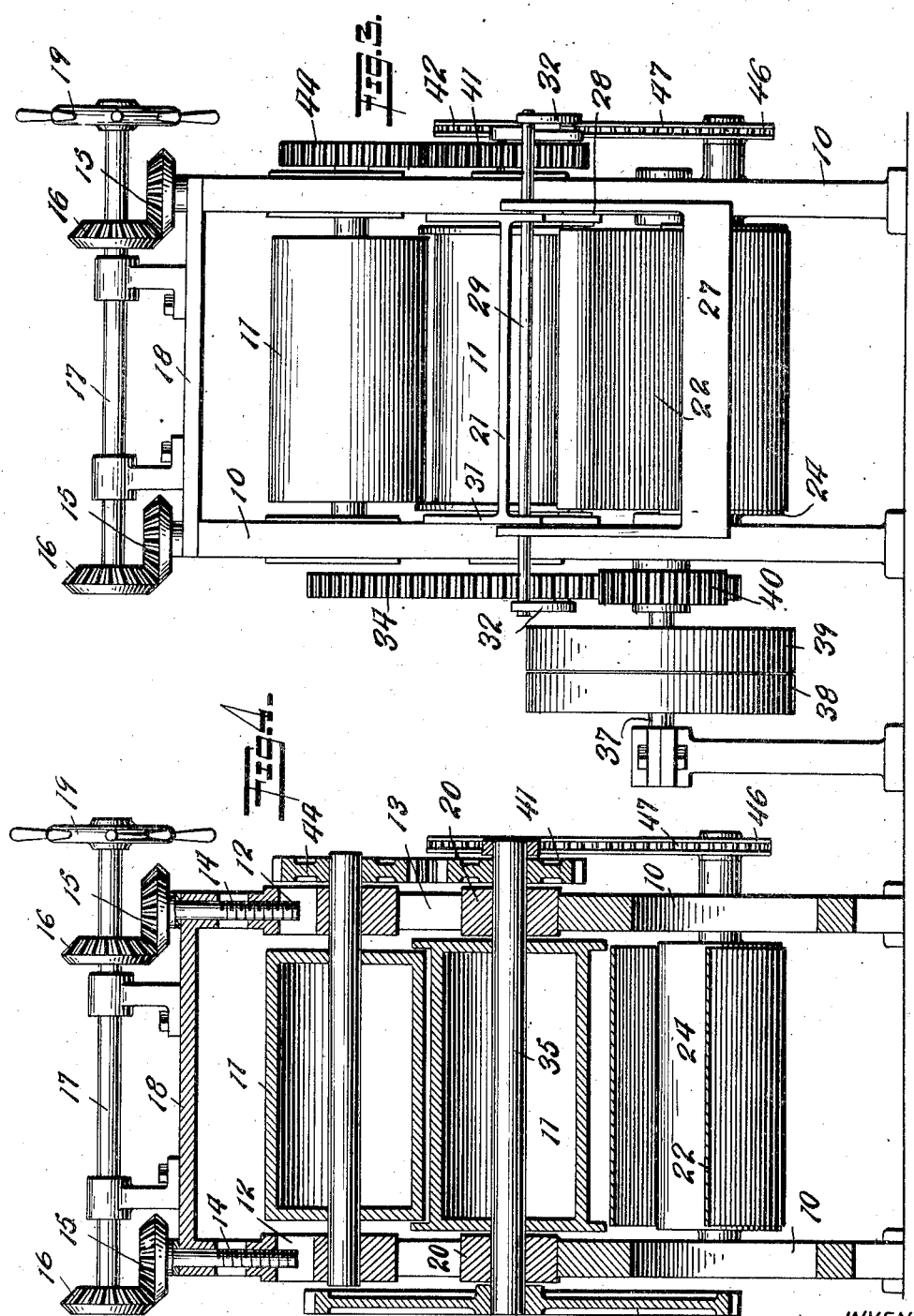

UNITED STATES PATENT OFFICE.

ISAAC RASKIN AND JAMES DERETCHIN, OF NEW YORK, N. Y.

DOUGH-BRAKE.

1,007,732.  Specification of Letters Patent.  Patented Nov. 7, 1911.

Application filed April 23, 1910. Serial No. 557,306.

*To all whom it may concern:*

Be it known that we, ISAAC RASKIN and JAMES DERETCHIN, subjects of the Emperor of Russia, residing at New York, in the county of New York and State of New York, have invented new and useful Improvements in Dough-Brakes, of which the following is a specification.

This invention relates to dough-kneading machinery, and more especially to that kind of machine known as a dough-brake.

The object of the invention is to provide a dough-brake that will occupy comparatively little space and will deliver the dough sheet coming from the braking rolls back beneath the rolls to the front of the machine, to enable the dough to be fed to the rolls again.

A further object is to provide a dough-box for receiving the dough sheet, which box is moved forward and backward to cause the sheet to be received in folded condition therein.

A further object is to hang the dough box below the feeding surface, whereby the box may be swung up over said surface to re-deliver the dough thereto.

With these and other objects in view, as will become apparent as the specification proceeds, the invention consists in the parts, arrangements and combinations hereinafter described and in the claims more particularly pointed out.

In the drawings, showing, as illustrative, the preferred form of the invention: Figure 1 is a side elevation of the machine; Fig. 2 is a longitudinal section therethrough; Fig. 3 is an end view; and Fig. 4 is a transverse vertical section.

The machine has a suitable framework, including side frames 10. Coöperating braking rolls 11 are mounted in and extend between these side frames. Suitable arrangements may be provided whereby the distance between the rolls may be varied. In the construction illustrated, the upper roll is journaled in boxes 12, which are mounted slidably in slots 13 in the side frames 10. These boxes have internally threaded portions which are engaged by screws 14. These screws are journaled in the framework and carry bevel gears 15, which are engaged by other bevel gears 16 on a shaft 17, which shaft is journaled in brackets on a top frame piece 18 and is provided with a hand wheel 19. The lower roll 11 is journaled in boxes 20 resting on the bottoms of the slots 13.

No claim is made to the particular mode of journaling and adjusting the braking rolls.

A feed surface is provided for conducting the dough to the braking rolls 11. In the form of the invention illustrated, this feed surface is a stationary surface, but this is not essential to the invention. The particular embodiment of feed surface shown is a table 21, over which the dough may be pushed by the hand or by a suitable instrument.

In accordance with the invention, conveying means, as shown, an apron 22, is located below the rolls 11 and the feed surface 21 and is arranged to carry the dough sheet back to the front of the machine. This apron extends sufficiently far to the rear to receive the dough sheet which hangs down from the rolls at the rear thereof. As shown, the apron inclines upward toward the front. The apron passes about and is carried by rollers 23 and 24, suitably mounted in the framework of the machine; and preferably the front roller 23 is of small diameter. Means, as screws 25, may be provided for taking up slack in the apron.

In accordance with the invention, a box 27 is provided for receiving the dough sheet from the apron 22. This box is constructed and arranged to receive the dough sheet in folded condition and to re-deliver it to the table 21. In the best form of the invention, the box is hung beneath the table and the front end of the apron by suitable hangers 28, which permit the box to be swung up and inverted over the table. In the particular construction illustrated, the hangers 28 are supported on a cross-rod 29, which is received in horizontal slots 30 to slide laterally backward and forward therein. These slots 30 are shown as being formed in vertical side boards 31 of the table 21. The box 27 is shown as being moved backward and forward by connecting rods 32, which are pivoted at their forward ends to the cross-rod 29 and at their rear ends, respectively to a crank arm 33 and a wheel 34, both on a shaft 35. The box 27 is provided with a suitable hand hold 36, whereby it may be swung up over the table manually.

The particular form of gearing is not material to the invention. As shown, a driving shaft 37 has fast and loose pulleys 38 and 39 thereon, and also a pinion 40, which meshes with a gear 34, already referred to, which gear is fast on the shaft of the lower roll 11. On the opposite end of the shaft of this roll is a gear 41. This gear meshes with a gear 42, this gear with a gear 43, and the gear 43 with a gear 44 on the shaft of the upper roll 11. Rigid with the gear 42 is a sprocket wheel 45, which drives a sprocket wheel 46 on the shaft of the roller 24, by means of a sprocket chain 47.

Braces 48 may support the forward part of the table 21 from the side frames 10.

In the operation of the machine, dough is placed on the table 21 and pushed between the rolls 11. It comes out at the rear of these rolls in the form of a sheet and descends upon the forward traveling apron 22, at the forward end of which the dough sheet descends into the reciprocating box 27 and is there collected in folded condition. When all the dough sheet is folded into the box, the latter is swung up over the table, and the folded sheet is deposited thereon. The upper edge of the folded sheet may now be pulled forward manually and inserted between the rolls 11, which draw the sheet through again. The operation may be repeated as often as desired, and the rolls may be adjusted toward each other from time to time, or after each rolling, to make the sheet progressively thinner. With this machine, no operator at the rear of the machine is required.

A scraper 49 may be adjustably mounted in rear of the lower roller 11. A shield 50 may be located in rear of the rollers, to prevent dough being lost at the back of the machine.

What is claimed as new is:

1. In a dough brake, the combination of coöperating braking rolls, a feed surface adapted to conduct the dough to said rolls, an endless traveling dough-receiving and carrying surface disposed below the rolls and thence extending forward below the feed surface and considerably in advance of the rolls for carrying the dough sheet back to the front of the machine, means for driving the endless surface so as to cause its upper course to travel forward beneath the rolls and feed surface, and a dough-receiving surface below the forward part of said carrying surface and below the feed surface and braking rolls and adapted and arranged to receive the dough sheet from the carrying surface and movable up over the feed surface to redeliver the dough thereto.

2. In a dough-brake, the combination of coöperating braking rolls, a feed surface adapted to conduct the dough to said rolls, an endless traveling dough-receiving and carrying surface disposed below the rolls and thence extending forward below the feed surface and considerably in advance of the rolls for carrying the dough sheet back to the front of the machine, means for driving the endless surface so as to cause its upper course to travel forward beneath the rolls and feed surface, and a box hung below the forward part of said carrying surface and below the feed surface and braking rolls and adapted to receive the dough sheet from the carrying surface and to be swung up over said feed surface to re-deliver the dough thereto.

3. In a dough-brake, the combination of coöperating braking rolls, a feed surface adapted to conduct the dough to said rolls, an endless traveling dough-receiving and carrying surface adapted and arranged to carry the dough sheet back to the front of the machine, a receiving surface below the forward part of said carrying surface adapted and arranged to receive the dough sheet from the carrying surface, and means for moving said receiving surface back and forth during the reception of the dough sheet thereon, whereby the dough sheet is folded thereon.

4. In a dough-brake, the combination of coöperating braking rolls, a feed surface adapted to conduct the dough to said rolls, an endless traveling dough-receiving and carrying surface beneath said rolls and feed surface adapted and arranged to carry the dough sheet back to the front of the machine, a receiving surface below the forward part of said carrying surface and adapted and arranged to receive the dough sheet from the carrying surface, said receiving surface being movable up over the feed surface to re-deliver the dough thereto, and means for moving said receiving surface back and forth during the reception of the dough sheet thereon whereby the dough is received in folded condition.

5. In a dough-brake, the combination of braking rolls adapted to deliver a continuous sheet of dough, a receiving surface adapted to receive the dough sheet after coming from said rolls, and means for reciprocating the receiving surface in place so as to cause the sheet to be received thereon in a folded pile, said receiving surface being movable to deliver said folded pile in position to pass again through the rolls.

6. In a dough-brake, the combination of braking rolls, a receiving surface adapted to receive the dough sheet after coming from said rolls, means for reciprocating the receiving surface in place so as to cause the sheet to be received thereon in a folded pile, and a pivoted hanger supporting said receiving surface and enabling said surface to be swung up to deliver the folded sheet for another passage through the rolls.

In testimony whereof we have hereunto set our hands in presence of two subscribing witnesses, this 18th day of April, 1910.

ISAAC RASKIN.
JAMES DERETCHIN.

Witnesses:
J. F. BRANDENBURG,
G. ROBERT THOMAS.